United States Patent
Tsai

(10) Patent No.: US 7,063,341 B2
(45) Date of Patent: *Jun. 20, 2006

(54) COLLAPSIBLE SKATEBOARD

(75) Inventor: Shui-Te Tsai, Taipei (TW)

(73) Assignee: Razor USA LLC, Cerritos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/217,123

(22) Filed: Aug. 13, 2002

(65) Prior Publication Data

US 2002/0195786 A1 Dec. 26, 2002

Related U.S. Application Data

(63) Continuation of application No. 09/816,311, filed on Mar. 26, 2001, now Pat. No. 6,431,567, which is a continuation of application No. 09/222,840, filed on Dec. 30, 1998, now Pat. No. 6,206,387.

(51) Int. Cl.
*B62M 1/00* (2006.01)
(52) U.S. Cl. ............... 280/87.041; 280/14.28; 280/278; 16/359; 403/92
(58) Field of Classification Search ........... 280/14.27, 280/14.28, 87.021, 87.041, 87.042, 87.05, 280/278, 287; 16/322, 326, 348, 349, 358, 16/359; 403/91, 92, 93, 94, 96; 248/188.6
See application file for complete search history.

(56) References Cited

U.S. PATENT DOCUMENTS

| | | | |
|---|---|---|---|
| 1,297,282 A | 3/1919 | White | |
| 1,391,312 A | 9/1921 | Gebhardt | |
| 1,570,189 A * | 1/1926 | Sturm | .................. 294/51 |
| 1,658,068 A | 2/1928 | White | |
| 1,687,953 A | 10/1928 | Starks | |
| 1,968,975 A | 8/1934 | Upsacker et al. | |
| 2,546,711 A | 3/1951 | Amendt | |
| 3,396,928 A * | 8/1968 | Lay | ............... 248/188.6 |
| 4,584,735 A * | 4/1986 | Garber | ............... 15/257.7 |
| 4,707,884 A | 11/1987 | Chang | |
| 4,735,392 A * | 4/1988 | Farmer | ............... 248/188.6 |
| 4,905,946 A | 3/1990 | Wang | |
| 5,102,079 A | 4/1992 | Lee | |
| 5,183,129 A * | 2/1993 | Powell | ............... 180/278 |
| 5,437,425 A | 8/1995 | Hou | |
| 5,816,614 A | 10/1998 | Kramer, Jr. et al. | |
| 5,927,733 A | 7/1999 | Banda | |
| 5,938,223 A | 8/1999 | Kotlier | |
| 5,992,566 A * | 11/1999 | Yeh | ............... 182/163 |
| 6,120,044 A | 9/2000 | Tsai | |
| 6,182,988 B1 | 2/2001 | Wu | |
| 6,206,387 B1 * | 3/2001 | Tsai | ............... 280/87.041 |
| 6,431,567 B1 * | 8/2002 | Tsai | ............... 280/87.041 |

\* cited by examiner

*Primary Examiner*—Christopher P. Ellis
*Assistant Examiner*—Christopher Bottorff
(74) *Attorney, Agent, or Firm*—Knobbe, Martens, Olson & Bear LLP

(57) ABSTRACT

A collapsible skateboard includes an upright handle having lower portion on which is fixedly mounted a bracket, a connector having a curved slot having a lower end formed with a horizontal recess, an upper end formed with a vertical recess, and a circular hole under the vertical recess, an adjust pin inserted into the vertical recess of the connector and the elongated hole of the bracket, a pivot pin fitted through the circular hole of the connector and the circular hole of the bracket, a spring having an upper end connected to the adjust pin and a lower end to the pivot pin, and a platform on which is fixedly mounted the connector, whereby the skateboard can be easily folded up as desired.

8 Claims, 6 Drawing Sheets

COLLAPSIBLE SKATEBOARD

This is a continuation of parent application Ser. No 09/816,311, filed Mar. 26, 2001, now U.S. Pat. No. 6,431,567 itself a continuation of application Ser. No. 09/222,840, filed Dec. 30, 1998, now U.S. Pat. No. 6,206,387.

BACKGROUND OF THE INVENTION

1. Field of the Invention

This invention is related to an improvement in the structure of a collapsible skateboard.

2. Description of the Prior Art

The conventional skateboard with an upright handle is fixed in structure so that it is difficult to carry. Hence, a collapsible skateboard has been developed to obviate this drawback. However, such a collapsible skateboard is complicated in structure and expensive in cost. Furthermore, the handle of the collapsible skateboard cannot be kept at a fixed position, thereby making it inconvenient to use.

Therefore, it is an object of the present invention to provide an improved collapsible skateboard which can obviate and mitigate the above-mentioned drawbacks.

SUMMARY OF THE INVENTION

This invention is related to an improvement in the structure of a collapsible skateboard.

It is the primary object of the present invention to provide a collapsible skateboard that includes an upright handle having lower portion on which is fixedly mounted a bracket, a connector having a curved slot having a lower end formed with a horizontal recess, an upper end formed with a vertical recess, and a circular hole under the vertical recess, an adjust pin inserted into the vertical recess of the connector and the elongated hole of the bracket, a pivot pin fitted through the circular hole of the connector and the circular hole of the bracket, a spring having an upper end connected to the adjust pin and a lower end to the pivot pin, and a platform on which is fixedly mounted the connector.

It is another object of the present invention to provide a collapsible skateboard wherein the connection is a U-shaped member having two upwardly extending lugs each formed with the curved slot.

It is still another object of the present invention to provide a collapsible skateboard further comprising a control mechanism which includes a cylindrical member pivotally mounted on the bracket and having an end extending out of the bracket to fixedly connect with a lever and a hook extending downwardly within the bracket to engage with the adjust pin.

It is still another object of the present invention to provide a collapsible skateboard which can be easily folded as desired.

It is a further object of the present invention to provide a collapsible skateboard which is simple in construction.

DETAILED DESCRIPTION OF THE PREFERRED EMBODIMENT

Figure 1:
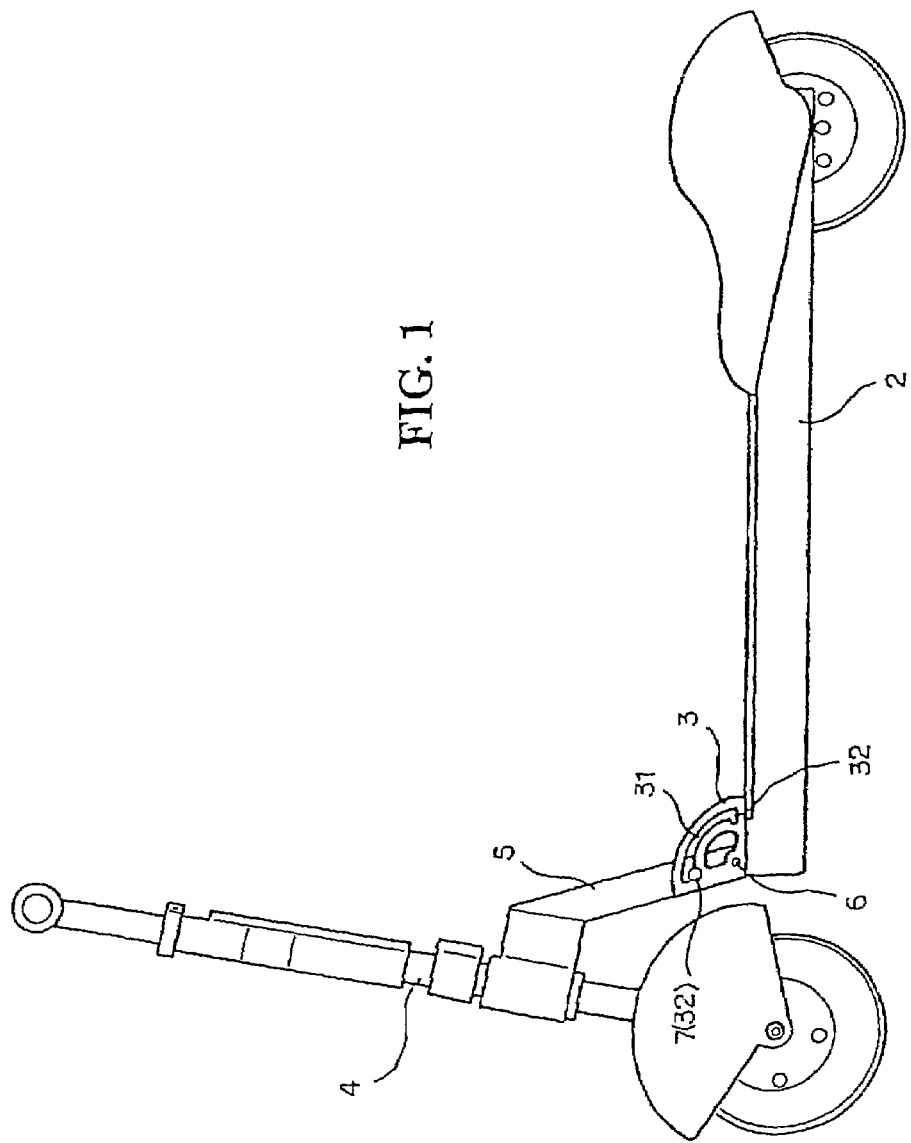
FIG. 1 is a side view of the present invention.
Figure 2:
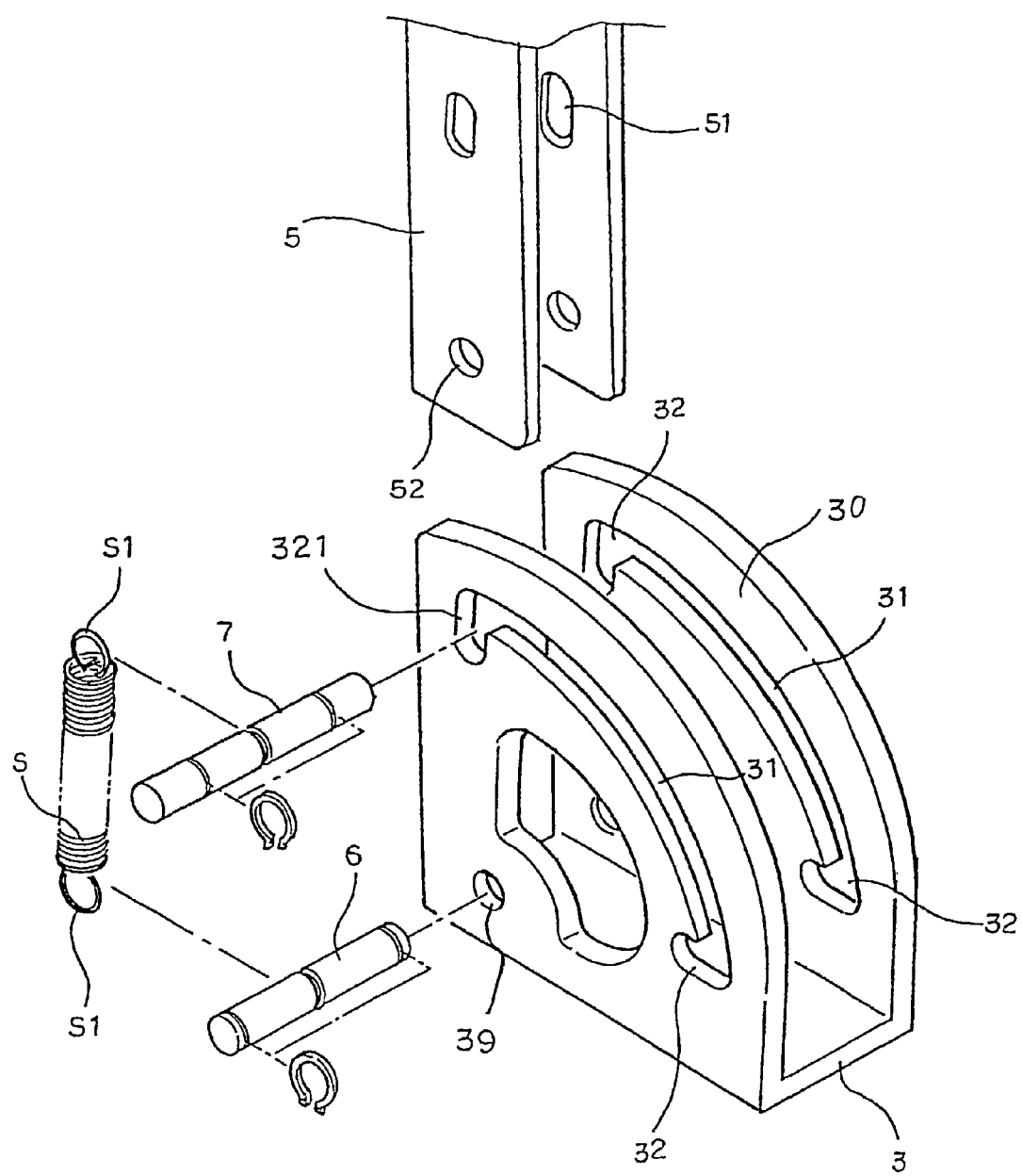
FIG. 2 is an exploded view of the present invention.
Figure 3:
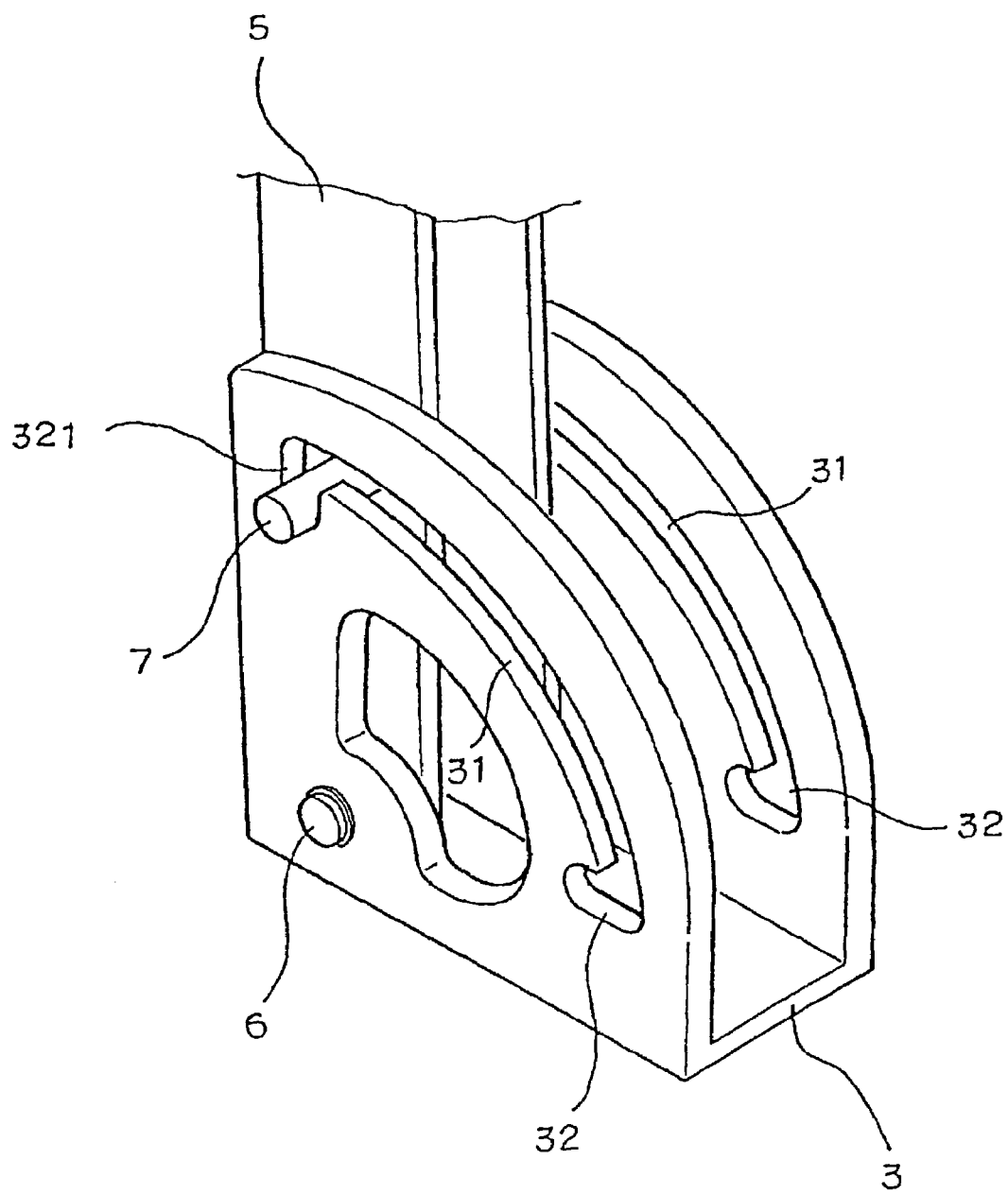
FIG. 3 is a perspective view of the present invention.
Figure 4:
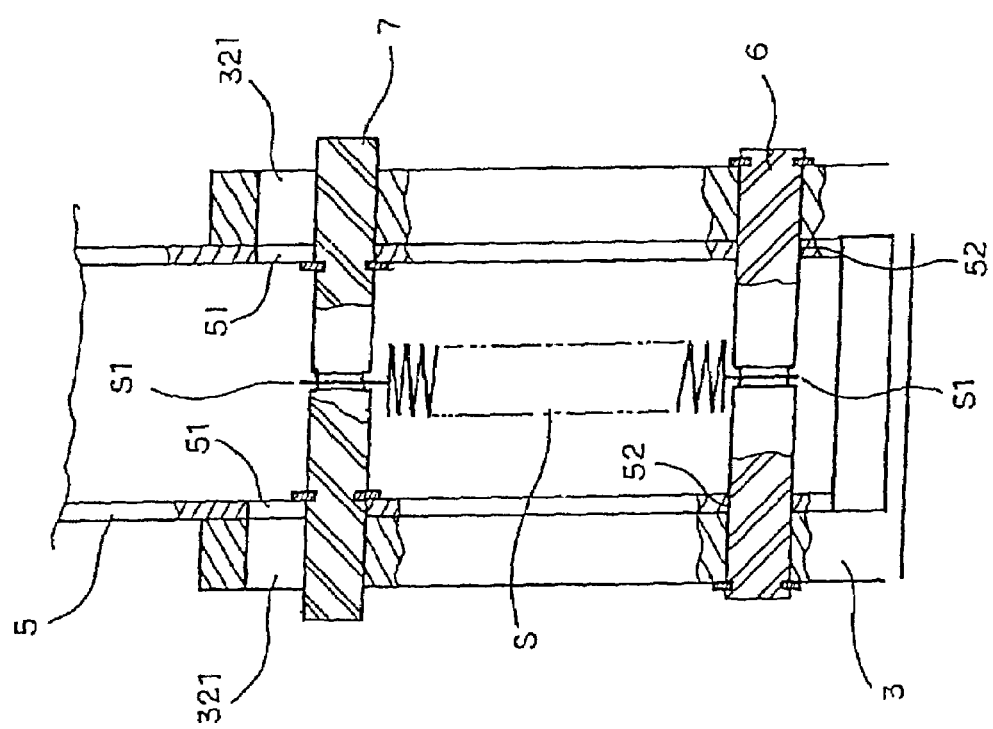
FIG. 4 is a sectional view of the present invention.

Referring to FIGS. 1, 2 and 3, the collapsible skateboard according to the present invention generally comprises an upright handle 4, a bracket 5, a connector 3 and a platform 2. The bracket 5 is fixedly mounted on the handle 4 and provided with two legs 5 extending downwardly toward the platform 2. Each leg 5 has an elongated hole 51 and a circular hole 52 below the elongated hole 51. The connector 3 is formed with two upwardly extending lugs 30 configured to receive the two legs 5 therein. Each of the lugs 30 has a curved slot 31 formed with a horizontal recess 32 at the lower end and a vertical: recess 321 at the upper end. Each lug 30 is further formed with a circular hole 39 below the vertical recess 321. An adjust sin 7 is inserted into the vertical recesses 321 of the connector 3 and the elongated holes 51 of the bracket 5. A pivot pin 6 is fitted through the circular holes 39 of the connector 30 and the circular holes 52 of the bracket 5 so that the handle 4 together with the bracket 5 can be folded on the platform 2. A spring S has an upper end S1 connected to the intermediate portion of the adjust pin 7 and a lower end connected to the intermediate portion of the pivot pin 6 so that the adjust pin 7 will be retained within the vertical recess 321 thereby keeping the handle 4 at an upright position.

Figure 5:
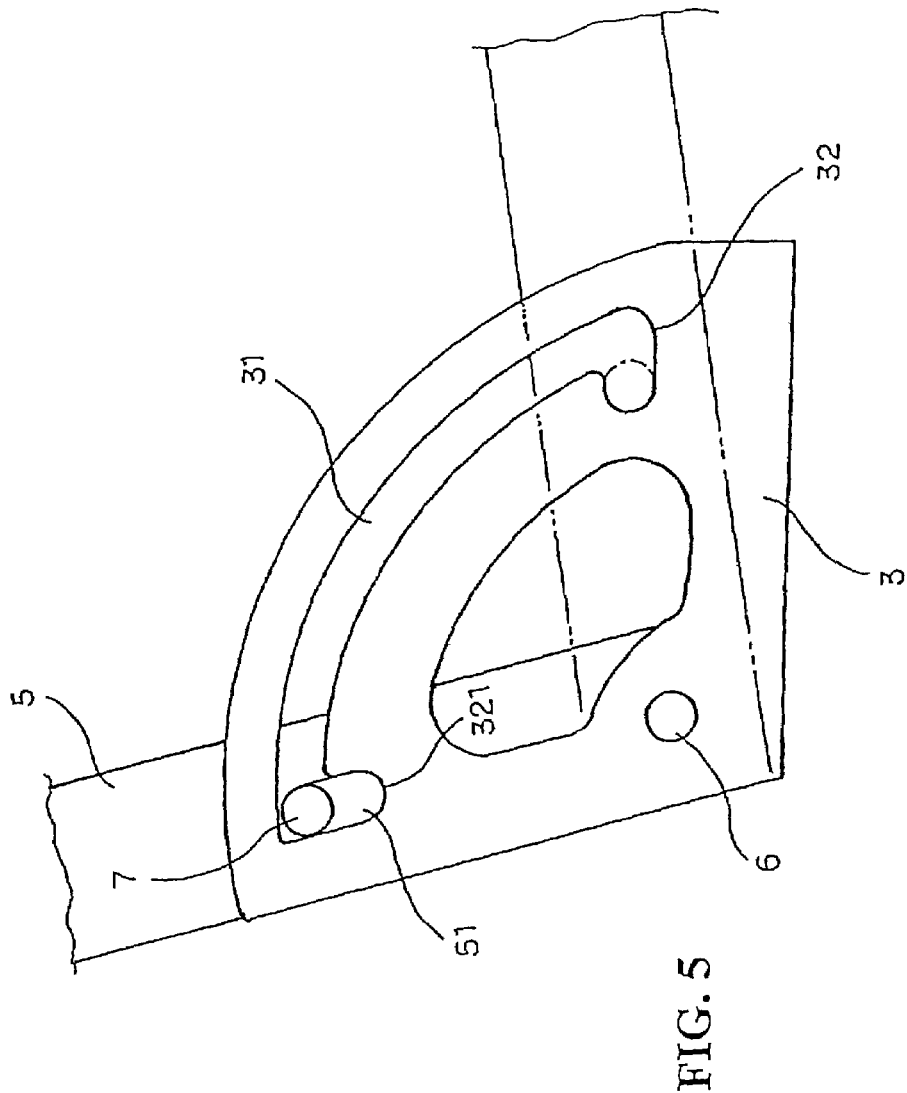
FIG. 5 illustrates the working principle of the present invention.

When desired to fold the skateboard, it is only necessary to move the adjust pin 7 upwardly out of the vertical recesses 321 and then move the handle 4 together with the bracket 5 toward the platform 2 so that the adjust pin 7 is moved along the curved slots 31 to engage with the horizontal recesses 32 (see FIG. 5). When in use, simply move the handle 4 along the direction away from the platform 2 so that the adjust pin 7 is moved along the curved slots 31 to engage with the vertical recesses 321.

Figure 6A:
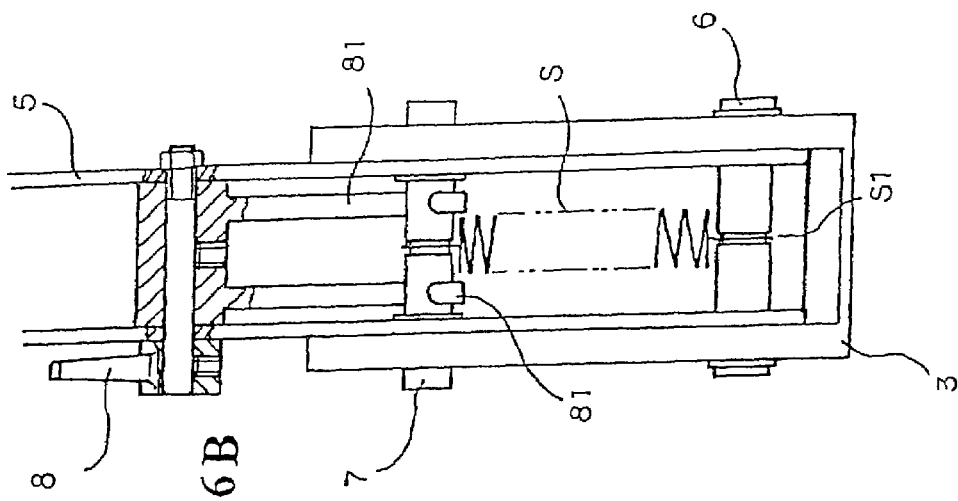
FIGS. 6A and 6B illustrate another preferred embodiment of the present invention.
Figure 6B:
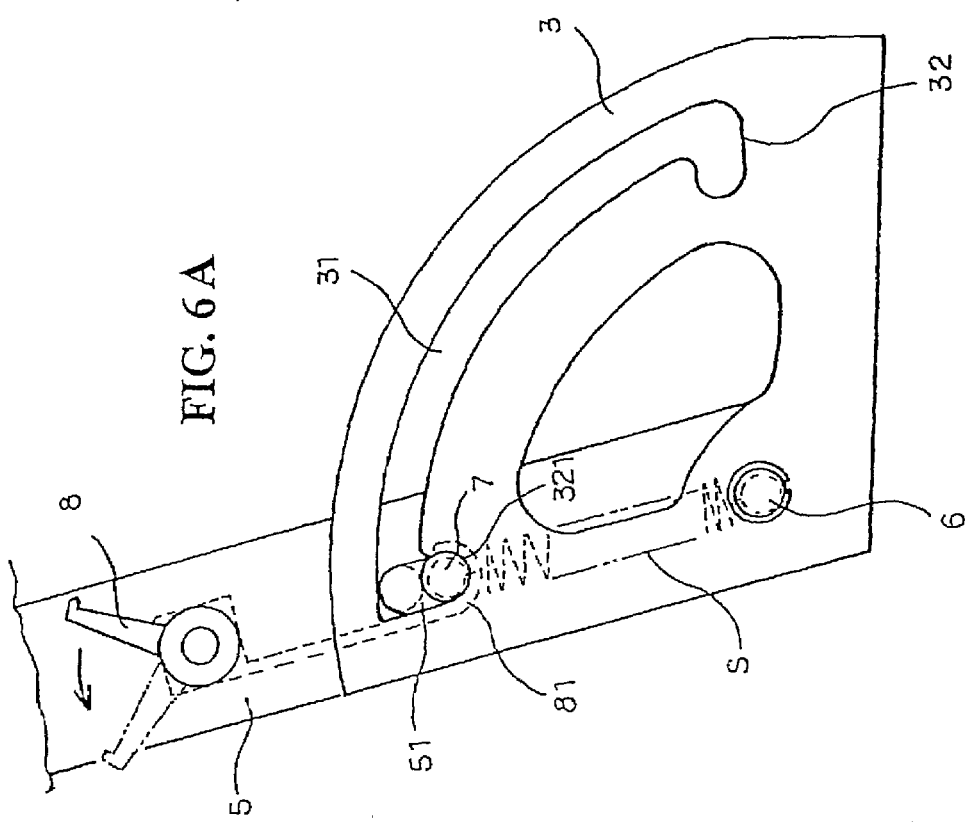

FIGS. 6A and 6B illustrate another preferred embodiment of the present invention. As shown, a control mechanism 8 is pivotally mounted on the bracket 5 and arranged above the adjust pin 7. The control mechanism 8 includes a cylindrical member pivotally mounted on the bracket 5 and having an end extending out of the bracket 5 to fixedly connect with a lever 8 and a hook 81 extending downwardly within the bracket 5 to engage with the adjust pin 7, so that the adjust pin 7 can be moved upwardly out of the vertical recesses 321 by turning the lever 8 thereby enabling the handle 4 to fold on the platform 2 as desired.

Other objects of the invention will in part be obvious and in part hereinafter pointed out.

The invention accordingly consists of features of constructions and method, combination of elements, arrangement of parts and steps of the method which will be exemplified in the constructions and method hereinafter disclosed, the scope of the application of which will be indicated in the claims following.

I claim:

1. A collapsible skateboard comprising:
    a platform having front and rear ends, said platform having a rear wheel mounted at said rear end;
    a connector mounted along said front end of said platform, said connector formed with a surface having a first recess and a second recess;
    an upright handle having top and bottom ends, said upright handle having a front wheel mounted at said bottom end;

a bracket coupled to said upright handle and extending toward said platform, said upright handle being rotatable within said bracket for providing a steering mechanism;
a pivot pin coupled to said connector and extending through said bracket for enabling said upright handle to fold towards said platform;
an adjust pin slidably coupled to said bracket and insertable into said first recess for locking said upright handle in a folded position and into said second recess for locking said upright handle in an operable position;
a biasing apparatus for urging said adjust pin toward said pivot pin and into said first or second recess; and
a control mechanism adapted for moving said adjust pin independently of said bracket and said connector to release said adjust pin from said first or second recess;
wherein said connector includes two upwardly extending lugs, each lug formed with said surface and said first and second recesses.

2. A collapsible skateboard comprising:
a platform having front and rear ends, said platform having a rear wheel mourned at said rear end;
a connector mounted along said front end of said platform, said connector formed with a surface having a first recess and a second recess;
an upright handle having top and bottom ends, said upright handle having a front wheel mounted at said bottom end;
a bracket coupled to said upright handle and extending toward said platform, said upright handle being rotatable within said bracket for providing a steering mechanism;
a pivot pin coupled to said connector and extending through said bracket for enabling said upright handle to fold towards said platform;
an adjust pin slidably coupled to said bracket and insertable into said first recess for locking said upright handle in a folded position and into said second recess for locking said upright handle in an operable position;
a biasing apparatus for urging said adjust pin toward said pivot pin and into said first or second recess; and
a control mechanism adapted for moving said adjust pin independently of said bracket and said connector to release said adjust pin from said first or second recess;
wherein said connector is formed with a slot and wherein a bottom edge of said slot provides said surface.

3. A collapsible skateboard comprising:
a platform having front and rear ends, said platform having a rear wheel mounted at said rear end;
a connector mounted along said front end of said platform, said connector formed with a surface having a first recess and a second recess;
an upright handle having top and bottom ends, said upright handle having a front wheel mounted at said bottom end;
a bracket coupled to said upright handle and extending toward said platform, said upright handle being rotatable within said bracket for providing a steering mechanism;
a pivot pin coupled to said connector and extending through said bracket for enabling said upright handle to fold towards said platform;
an adjust pin slidably coupled to said bracket and insertable into said first recess for locking said upright handle in a folded position and into said second recess for locking said upright handle in an operable position;
a biasing apparatus for urging said adjust pin toward said pivot pin and into said first or second recess; and
a control mechanism adapted for moving said adjust pin independently of said bracket and said connector to release said adjust pin from said first or second recess;
wherein said biasing apparatus has a first end attached to said skateboard and a second end coupled to said adjust pin for providing a biasing force to maintain said adjust pin in said first or second recess.

4. A collapsible skateboard comprising:
a platform having front and rear ends, said platform having a rear wheel mounted at said rear end;
an upright handle having top and bottom ends, said upright handle having a front wheel mounted at said bottom end;
a bracket coupled to said upright handle and extending toward said platform, said upright handle being rotatable within said bracket for providing a steering mechanism;
a pivot pin for pivotally coupling said bracket to said platform;
a connector mounted along said front end of said platform, said connector formed with a surface having first and second recesses, said first and second recesses extending from said surface toward said pivot pin;
an adjust pin slidable along said surface and movable toward said pivot pin for insertion into said first recess for locking said upright handle in a collapsed position and into said second recess for locking said upright handle in an operable position, said adjust pin being movable away from said pivot pin for releasing said adjust pin from said first or second recess, thereby allowing said bracket to pivot relative to said platform;
a biasing apparatus coupled to said skateboard for maintaining said adjust pin in said first or second recess; and
a control mechanism disposed along said bracket and coupled to said adjust pin, wherein said control mechanism is configured for moving said adjust pin independently of said bracket and said connector for releasing said adjust pin from said first or second recess;
wherein said biasing apparatus has a first end coupled to said adjust pin and a second end coupled to said pivot pin.

5. A collapsible skateboard comprising:
a platform having front and rear ends, said platform having a rear wheel mounted at said rear end;
a connector mounted along said front end of said platform, said connector formed with first and second engagement members;
an upright handle having top and bottom ends, said upright handle having a front wheel at said bottom end and a grip portion at said top end;
a bracket coupled to said upright handle and including an elongate hole, said upright handle being rotatable within said bracket for providing a steering mechanism, said bracket being pivotally coupled to said platform for enabling said upright handle to fold towards said platform as desired;
an adjust pin extending through said elongate hole in said bracket and being insertable into said first engagement member for locking said upright handle in a folded position and into said second engagement member for locking said upright handle in an operable position; and
a control mechanism for moving said adjust pin independently of said bracket and said connector to release said adjust pin from said first or second engagement member.

6. A collapsible skateboard comprising:
a platform having front and rear ends, said platform having a rear wheel mourned at said rear end;
a connector mounted along said front end of said platform, said connector formed with first and second engagement members;
an upright handle having top and bottom ends, said upright handle having a front wheel at said bottom end and a grip portion at said top end;
a bracket coupled to said upright handle and including an elongate slot, said upright handle being rotatable within said bracket for providing a steering mechanism, said bracket being pivotally coupled to said platform for enabling said upright handle to fold towards said platform as desired;
an adjust pin slidably movable within said elongate slot in said bracket and being insertable into said first engagement member for locking said upright handle in a folded position and into said second engagement member for looking said upright handle in an operable position; and
a control mechanism pivotally coupled to said bracket for moving said adjust pit independently of said bracket and said connector to release said adjust pin from said first or second engagement member.

7. A collapsible skateboard, comprising:
a platform having front and rear ends, said platform having a rear wheel mounted at said rear end;
an upright handle having top and bottom ends, said upright handle having a front wheel mounted at said bottom end and a grip portion at said top end;
a bracket coupled to said upright handle and extending toward said front end of said platform, said upright handle being rotatable within said bracket for providing a steering mechanism;
a pivot pin for pivotally coupling said bracket to said front end of said platform;
a connector mounted along said front end of said platform, said connector formed with a surface having first and second recesses;
an adjust pin coupled to said bracket and slidable toward said pivot pin for insertion into said first or second recess; and
a control mechanism connected to said adjust pin for selectively releasing said adjust pin from said first or second recess;
wherein said bracket is formed with an elongate hole extending therethrough and said adjust pin extends through said elongate hole, and wherein said control mechanism and said adjust pin are independently movable relative to said bracket and said connector, and wherein said adjust pin is insertable into said first recess for locking said upright handle in a collapsed position and wherein said adjust pin is insertable into said second recess for locking said upright handle in an operable position.

8. The collapsible skateboard of claim 7, wherein said bracket is formed with a circular hole for receiving said pivot pin.

* * * * *